(12) United States Patent
Barrs et al.

(10) Patent No.: US 7,395,386 B2
(45) Date of Patent: Jul. 1, 2008

(54) METHOD AND APPARATUS FOR DATA VERSIONING AND RECOVERY USING DELTA CONTENT SAVE AND RESTORE MANAGEMENT

(75) Inventors: John William Barrs, Austin, TX (US); Michael Wayne Brown, Georgetown, TX (US); Paul Stuart Williamson, Round Rock, TX (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 389 days.

(21) Appl. No.: 11/037,157

(22) Filed: Jan. 18, 2005

(65) Prior Publication Data

US 2006/0161598 A1   Jul. 20, 2006

(51) Int. Cl.
*G06F 12/00* (2006.01)
(52) U.S. Cl. .................................... 711/161
(58) Field of Classification Search ............ 711/161
See application file for complete search history.

(56) References Cited

U.S. PATENT DOCUMENTS

| | | |
|---|---|---|
| 5,029,125 A | 7/1991 | Sciupac |
| 5,347,653 A | 9/1994 | Flynn et al. ............ 395/600 |
| 5,371,675 A | 12/1994 | Greif et al. |
| 5,603,024 A | 2/1997 | Goldring ............... 395/619 |
| 5,757,372 A | 5/1998 | Krause et al. ........... 345/348 |
| 5,806,078 A | 9/1998 | Hug et al. ............... 707/511 |
| 5,893,908 A | 4/1999 | Cullen et al. |
| 5,924,096 A | 7/1999 | Draper et al. ............ 707/10 |
| 5,970,496 A * | 10/1999 | Katzenberger ........... 707/102 |
| 6,105,040 A | 8/2000 | Agesen |
| 6,125,371 A * | 9/2000 | Bohannon et al. ........ 707/203 |
| 6,286,016 B1 | 9/2001 | Heller et al. |
| 6,314,567 B1 | 11/2001 | Oberhauser et al. |
| 6,332,300 B1 | 12/2001 | Wakai |

(Continued)

FOREIGN PATENT DOCUMENTS

JP   10040151 A *  2/1998

OTHER PUBLICATIONS

IBM Technical Disclosure Bulletin, vol. 36, No. 10, Oct. 1993, "Change Flagging Delta System", pp. 331-333.

(Continued)

*Primary Examiner*—Tuan V. Thai
*Assistant Examiner*—Ryan Dare
(74) *Attorney, Agent, or Firm*—Duke W. Yee; Carlos Munoz-Bustamante; Peter B. Manzo

(57) ABSTRACT

A method, apparatus, and computer instructions for managing versioning data for memory segments. Responsive to a request from a requester to allocate a memory segment, the memory segment is allocated. A versioning data structure is created for the memory segment. The versioning data structure is used to store changes in data for the memory segment, and the memory segment includes a pointer to the versioning data structure. When a change in the data is detected for the memory segment, wherein the change in the data forms the delta data. Responsive to detecting the change in the data for the memory segment, the delta data is stored in the versioning data structure, wherein the versioning data structure is used to return the data in the memory segment to a prior state.

29 Claims, 5 Drawing Sheets

U.S. PATENT DOCUMENTS

| | | | |
|---|---|---|---|
| 6,418,485 | B1 | 7/2002 | Cooper et al. |
| 6,442,661 | B1 | 8/2002 | Dreszer |
| 6,463,526 | B1 | 10/2002 | Chaudhry et al. |
| 6,510,522 | B1 | 1/2003 | Heinrich et al. |
| 6,594,744 | B1 | 7/2003 | Humlicek et al. |
| 6,658,489 | B1 | 12/2003 | Asselin |
| 6,678,712 | B1 | 1/2004 | McLaren et al. |
| 6,725,241 | B1 | 4/2004 | Rodriguez et al. |
| 6,856,993 | B1 | 2/2005 | Verma et al. |
| 7,058,667 | B2 | 6/2006 | Goldick |
| 7,167,881 | B2 | 1/2007 | Yasuda et al. |
| 2002/0059328 | A1 | 5/2002 | Watkins ............. 707/203 |
| 2002/0073415 | A1 | 6/2002 | Kim et al. |
| 2002/0103814 | A1 | 8/2002 | Duvillier et al. |
| 2002/0107886 | A1 | 8/2002 | Gentner et al. ........ 707/511 |
| 2002/0108025 | A1* | 8/2002 | Shaylor ............. 711/203 |
| 2003/0041179 | A1 | 2/2003 | Snead et al. |
| 2003/0074378 | A1* | 4/2003 | Midgley et al. ....... 707/204 |
| 2003/0088866 | A1 | 5/2003 | Boldon et al. |
| 2003/0158861 | A1 | 8/2003 | Sawdon et al. |
| 2003/0204712 | A1 | 10/2003 | Inui et al. |
| 2004/0019652 | A1* | 1/2004 | Freimuth et al. ....... 709/213 |
| 2004/0044702 | A1* | 3/2004 | Alves et al. .......... 707/203 |
| 2005/0198236 | A1 | 9/2005 | Byers et al. |
| 2005/0256912 | A1 | 11/2005 | Krishnan et al. |
| 2006/0070089 | A1 | 3/2006 | Shoaib et al. |

OTHER PUBLICATIONS

Makki et al., "A New Storage Organization for Temporal Data Bases", J. Systems Software, 1984; 27:159-169.

Koeller et al., "History Driven View Synchronization", Dept. of Comput. Sci., Worcester Polytech. Inst., MA, USA, Abstract.

Rho et al., "An Operation-Based Model of Version Storage and Consistency Management for Fine-Grained Software Objects", Journal of KISS: Software and Applications, vol. 27, No. 7, pp. 691-701.

Barrs et al., Method and Apparatus for Dimensional Data Versioning and Recovery Management.

Barrs et al., Platform Infrastructure to Provide an Operating System Based Application Programming Interface Undo Service.

Barrs et al., Virtual Memory Management Infrastructure for Monitoring Deltas and Supporting Undo Versioning in a Paged Memory System.

Barrs et al., Infrastructure for Device Driver to Monitor and Trigger Versioning for Resources.

Barrs et al., Method and Apparatus for Managing Versioning Data in a Network Data Processing System.

Barrs et al., Heap Manager and Application Programming Interface Support for Managing Versions of Objects.

Barrs et al., Method and Apparatus for Marking Code for Data Versioning.

Barrs et al., Object Based Access Application Programming Interface for Data Versioning.

* cited by examiner

METHOD AND APPARATUS FOR DATA VERSIONING AND RECOVERY USING DELTA CONTENT SAVE AND RESTORE MANAGEMENT

CROSS REFERENCE TO RELATED APPLICATIONS

The present invention is related to the following patent applications: entitled "Method and Apparatus for Dimensional Data Versioning and Recovery Management", Ser. No. 11/037,127, entitled "Platform Infrastructure to Provide an Operating System Based Application Programming Interface Undo Service", Ser. No. 11/037,127, entitled "Virtual Memory Management Infrastructure for Monitoring Deltas and Supporting Undo Versioning in a Paged Memory System", Ser. No. 11/037,000, entitled "Infrastructure for Device Driver to Monitor and Trigger Versioning for Resources", Ser. No. 11/037,268, entitled "Method and Apparatus for Managing Versioning Data in a Network Data Processing System", Ser. No. 11/037,001, entitled "Heap Manager and Application Programming Interface Support for Managing Versions of Objects", Ser. No. 11/037,024, entitled "Method and Apparatus for Marking Code for Data Versioning", Ser. No. 11/037,322, and entitled "Object Based Access Application Programming Interface for Data Versioning", Ser. No. 11/037,145, filed even date hereof, assigned to the same assignee, and incorporated herein by reference.

BACKGROUND OF THE INVENTION

1. Technical Field

The present invention relates to an improved data processing system and in particular to a method and apparatus for processing data. Still more particularly, the present invention relates to a method, apparatus, and computer instructions for an automated, incremental versioning, backup and restore mechanism for data elements within a computer system.

2. Description of Related Art

Data storage components, variables, collections, and multi-dimensional collections are used throughout all computer applications. During the execution of an application, the contents of these types of data storage elements will change or evolve. These changes occur due to modifications or updates to the data. These changes may be made by user input or through programmatic means. As the program logic of an application progresses, situations often arise in which the program state and the content of the data storage elements need to be reset to a prior state. This state may be an arbitrary state selected by the user or programmatically by an application. Mechanisms for incrementally saving and resetting data to a prior known state are present in many applications.

Currently available mechanisms are found in applications, such as word processors, for resetting or rolling back to a previous state. A word processor may allow a user to undo changes to a document, such as deletions, insertions, or formatting changes.

A significant problem with existing mechanisms is that they are prone to inefficiencies and require explicit management by the application programmer or end user. Therefore, it would be advantageous to have an improved method, apparatus, and computer instructions for data versioning and recovery management.

SUMMARY OF THE INVENTION

The present invention provides a method, apparatus, and computer instructions for managing versioning data for memory segments. Responsive to a request from a requestor to allocate a memory segment, the memory segment is allocated. A versioning data structure is created for the memory segment. The versioning data structure is used to store changes in data for the memory segment, and the memory segment includes a pointer to the versioning data structure. When a change in the data is detected for the memory segment, wherein the change in the data forms the delta data. Responsive to detecting the change in the data for the memory segment, the delta data is stored in the versioning data structure, wherein the versioning data structure is used to return the data in the memory segment to a prior state.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
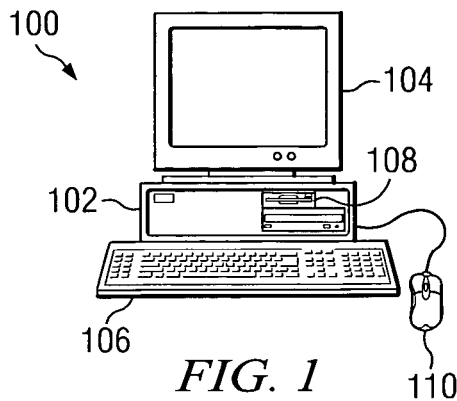
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. Computer 100 is depicted which includes system unit 102, video display terminal 104, keyboard 106, storage device 108, which may include floppy drives and other types of permanent and removable storage media, and mouse 110. Additional input devices may be included with personal computer 100, such as, for example, a joystick, touch pad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
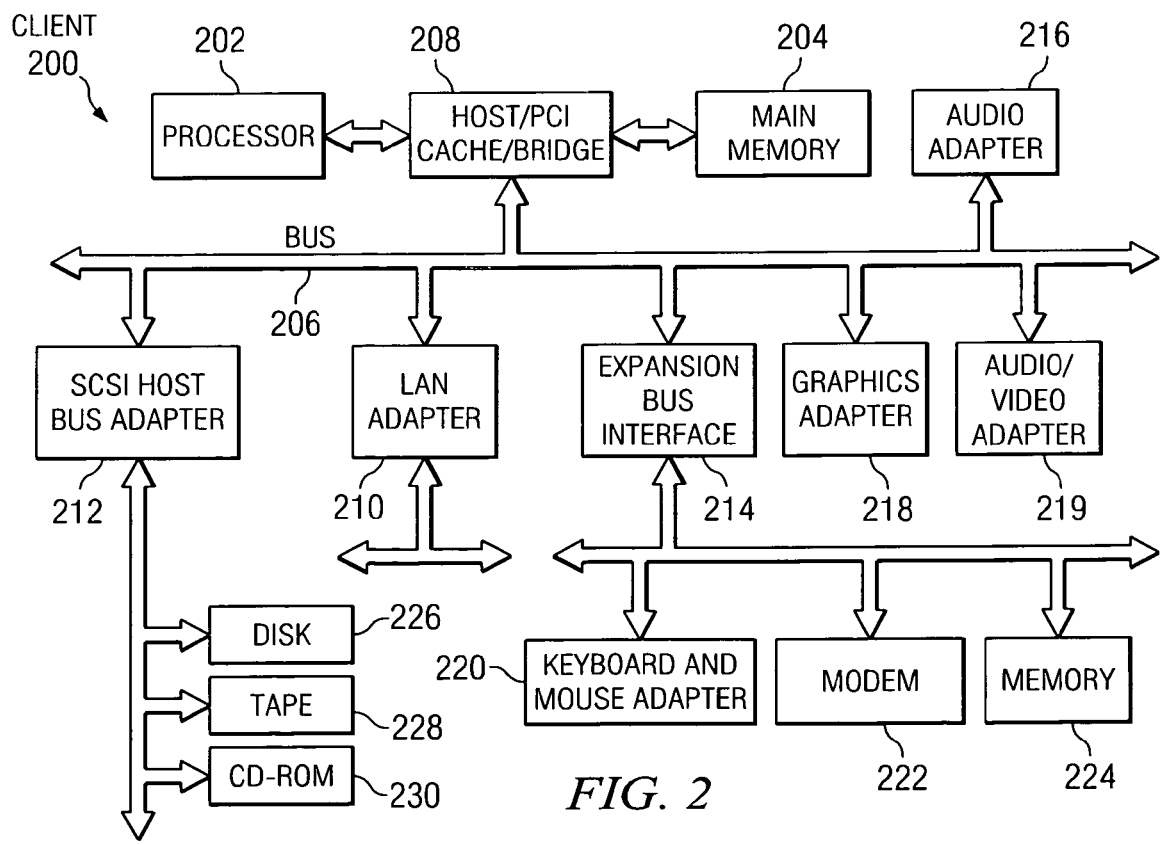
FIG. 2 is a block diagram of a data processing system in which the present invention may be implemented.

Referring to FIG. 2, a block diagram of a data processing system in which the present invention may be implemented. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bridge 210 is connected to system bus 206 and provides an interface to I/O bus 212. Memory controller/cache 208 and I/O bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to other data processing systems may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
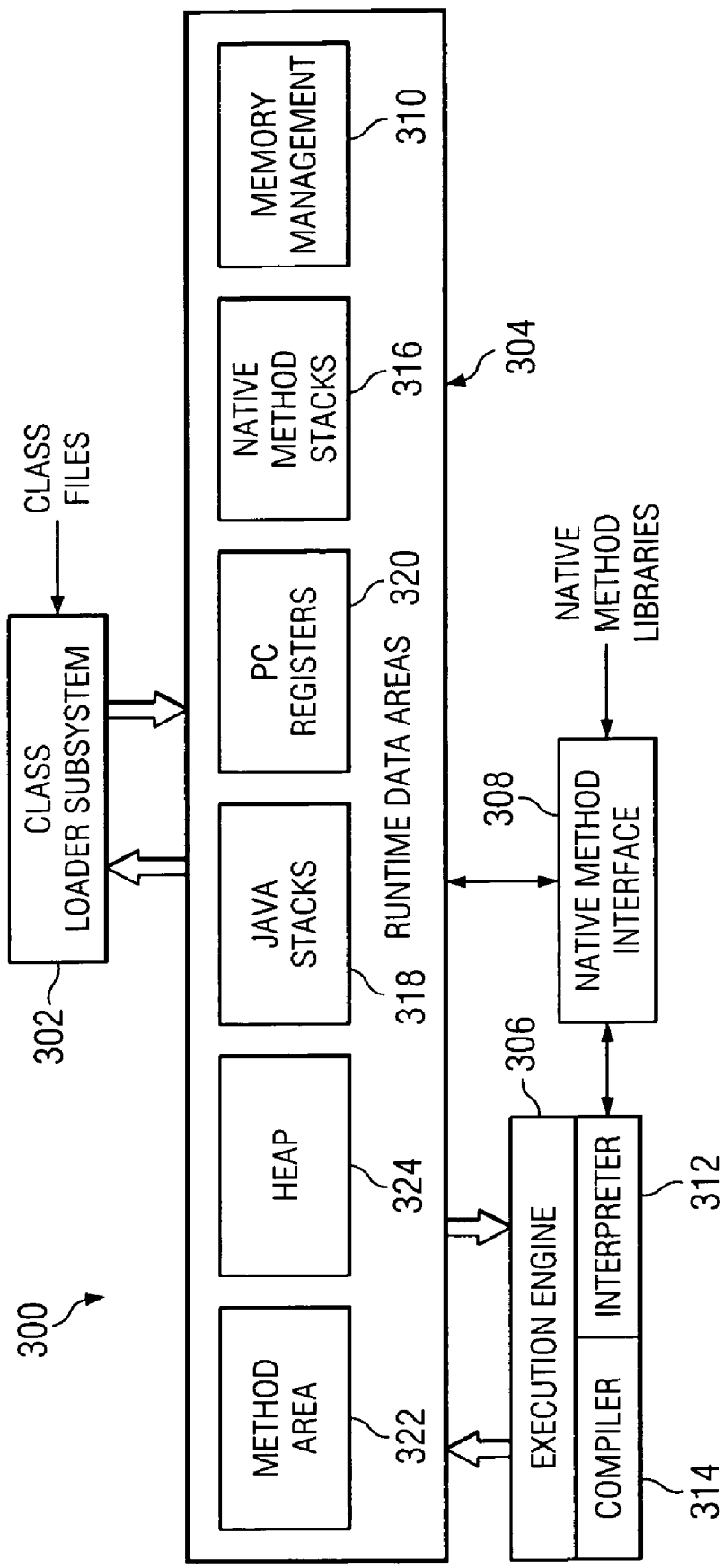
FIG. 3 is a block diagram of a Java virtual machine in accordance with a preferred embodiment of the present invention.

With reference now to FIG. 3, a block diagram of a Java virtual machine is depicted in accordance with a preferred embodiment of the present invention. Java virtual machine 300 includes class loader subsystem 302, which is a mechanism for loading types, such as classes and interfaces, given fully qualified names. Java virtual machine 300 also contains runtime data areas 304, execution engine 306, native method interface 308, and memory management 310. Execution engine 306 is a mechanism for executing instructions contained in the methods of classes loaded by class loader subsystem 302. Execution engine 306 may be, for example, Java interpreter 312 or just-in-time compiler 314. Native method interface 308 allows access to resources in the underlying operating system. Native method interface 308 may be, for example, the Java Native Interface (JNI).

Runtime data areas 304 contain native method stacks 316, Java stacks 318, PC registers 320, method area 322, and heap 324. These different data areas represent the organization of memory needed by Java virtual machine 300 to execute a program.

Java stacks 318 are used to store the state of Java method invocations. When a new thread is launched, the Java virtual machine creates a new Java stack for the thread. The Java virtual machine performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the Java virtual machine pushes a new frame onto the Java stack of the thread. When the method completes, the Java virtual machine pops the frame for that method and discards it. The Java virtual machine does not have any registers for holding intermediate values; any Java instruction that requires or produces an intermediate value uses the stack for holding the intermediate values. In this manner, the Java instruction set is well defined for a variety of platform architectures.

Program counter (PC) registers 320 are used to indicate the next instruction to be executed. Each instantiated thread gets its own PC register and Java stack. If the thread is executing a Java virtual machine method, the value of the PC register indicates the next instruction to execute. If the thread is executing a native method, then the contents of the PC register are undefined.

Native method stacks 316 stores the state of invocations of native methods. The state of native method invocations is stored in an implementation-dependent way in native method stacks, registers, or other implementation-dependent memory areas. In some Java virtual machine implementations, native method stacks 316 and Java stacks 318 are combined.

Method area 322 contains class data while heap 324 contains all instantiated objects. The constant pool is located in method area 322 in these examples. The Java virtual machine specification strictly defines data types and operations. Most Java virtual machines choose to have one method area and one heap, each of which is shared by all threads running inside the Java virtual machine, such as Java virtual machine 300. When Java virtual machine 300 loads a class file, it parses information about a type from the binary data contained in the class file. Java virtual machine 300 places this type of information into the method area. Each time a class instance or array is created, the memory for the new object is allocated from heap 324. Java virtual machine 300 includes an instruction that allocates memory space within the memory for heap 324 but includes no instruction for freeing that space within the memory. Memory management 310 in the depicted example manages memory space within the memory allocated to heap 324. Memory management 310 may include a garbage collector, which automatically reclaims memory used by objects that are no longer referenced. Additionally, a garbage collector also may move objects to reduce heap fragmentation.

The present invention provides a memory management subsystem to provide for data versioning and recovery management. The mechanism of the present invention saves modifications or deltas in data when memory segments in memory are changed. Memory segment is an allocatable unit of memory available from the heap. A memory segment may contain one or more objects. Additionally, a memory segment may contain only part of an object with the other part of the object being located in one or more other memory segments.

A delta in data is the difference between the data in its prior version and its current version. The different deltas may be used to restore memory segments to a prior state. In these illustrative examples, the memory management subsystem may be, for example, memory management 310 and heap 324 in FIG. 3. The mechanism of the present invention modifies this heap to include data structure for restoring delta data for memory segments. In these examples, delta data represents changed values or data for a particular memory segment. This delta data is associated with an index. This index may take various forms, such as a number or a timestamp.

In particular, these changes between the prior data and the current data in its changed form are stored in a data structure, such as, for example, a linked list in a heap. The data structure is associated with a memory segment. In the illustrative examples, a memory segment is associated with the versioning data structure using at least one of a pointer and an offset. The mechanism of the present invention modifies the memory management system to automatically generate this linked list in the heap of a Java virtual machine without requiring any special requests from applications or the user.

Figure 4:
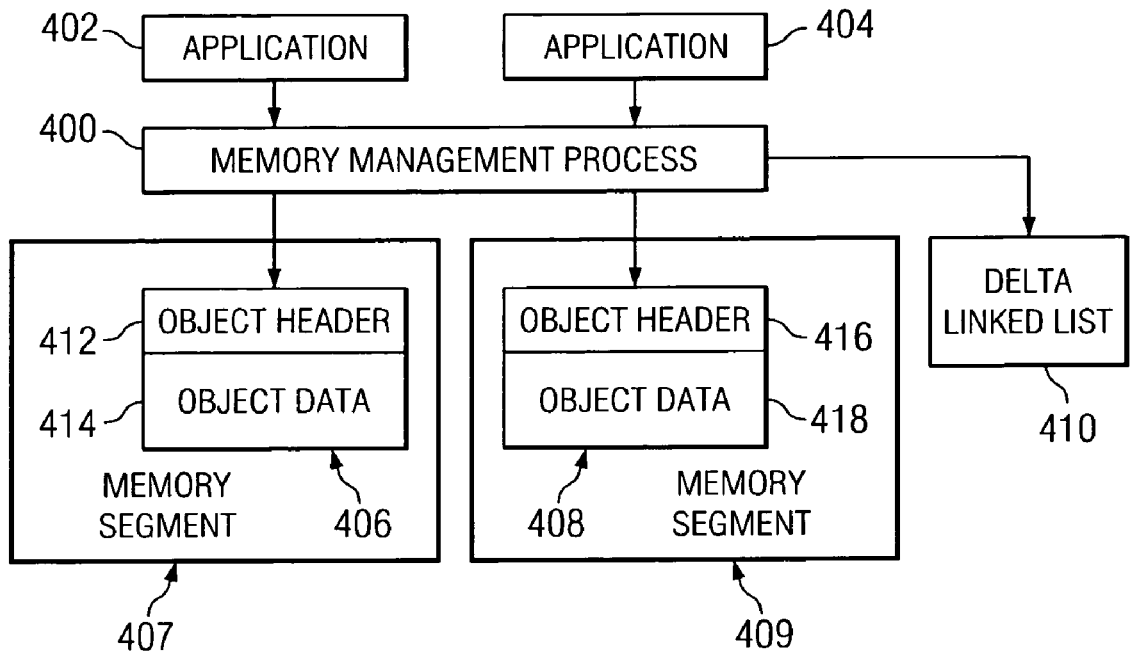
FIG. 4 is a diagram illustrating components used in data versioning and recovery in accordance with a preferred embodiment of the present invention.

Turning now to FIG. 4, a diagram illustrating components used in data versioning and recovery is depicted in accordance with a preferred embodiment of the present invention. Memory management process 400 receives requests from applications, such as application 402 and application 404 to allocate objects. These objects are allocated from the available memory segments. Memory management process 400 may be implemented in a memory management component, such as memory management 310 in FIG. 3.

In response to receiving these requests, data objects, such as data object 406 and data object 408, are allocated by memory management process 400. These data objects are located in memory segments 407 and 409 in a heap, such as heap 324, in these examples. Additionally, delta linked list 410 is located within heap 324. This particular data structure contains a linked list of entries that identify delta data for various memory segments, such as memory segment 407 and memory segment 409.

In this example, object 406 includes memory segment header 412 and memory segment data 414. Object 408 includes memory segment header 416 and memory segment data 418. Memory segment data 414 and memory segment data 418 contain the data for the memory segment in its current state. Memory segment header 412 includes a pointer or offset to delta linked list 410. In a similar fashion, memory segment header 416 also includes an offset or header in the delta linked list 410.

If a request is received by memory management process 400 to restore one of the memory segments in the heap to a prior state, the process identifies the memory segment and an index to identify the state that is desired. This index may be, for example, a numerical value or a timestamp. If, for example, memory segment 407 is identified in the request, the object header is used to find delta linked list 410. The link list is managed by the memory management subsystem, which also calculates the delta data in these illustrative examples. The index in the request is used to identify the desired state for memory segment 407. Based on the particular entry identified in linked list 410, the linked list may be traversed to make the appropriate changes to memory segment 407 to return that memory segment to its original state. In turn, object 406 also is returned to its original state because this object is located within memory segment 407.

In these depicted examples, all of the delta data for all memory segments is stored within delta linked list 410. The entries that apply to a particular memory segment may be identified through an object identifier that is found within each entry of delta linked list 410.

In other illustrative examples, a separate linked list data structure may be used for each memory segment. In this case, the object header provides an offset to the particular linked list data structure for that memory segment.

When application 402 changes a memory segment, such as memory segment 407, memory management process 400 creates an entry within delta linked list 410 to store the delta data. The memory management process 400 can detect changes in a memory segment using a number of different mechanisms. For example, the application, making a call to assign a value to an object being managed by the memory management process 400, the memory management process 400 detects this call and generates delta data. For example, the delta data may be the difference between the old value and the new value. In another example, all of the memory segments are examined periodically to see whether a change has occurred since the last time data for the memory segments was stored in delta linked list 410. This comparison is made by comparing the data in the memory segment with a previous copy of the date for the memory segments. In another example, an explicit API call may be made to generate a change in the memory segment. This receipt of this call is used to detect the change in data. Specifically, any changed values in memory segment 407 are stored within delta linked list 410 in association with the identification of memory segment 407 and an index, such as a numerical value or a timestamp. In this manner, all changes to memory segment 407 are stored within delta linked list 410. Thus, memory segment 407 may be returned to any prior state desired using this data structure.

Figure 5:
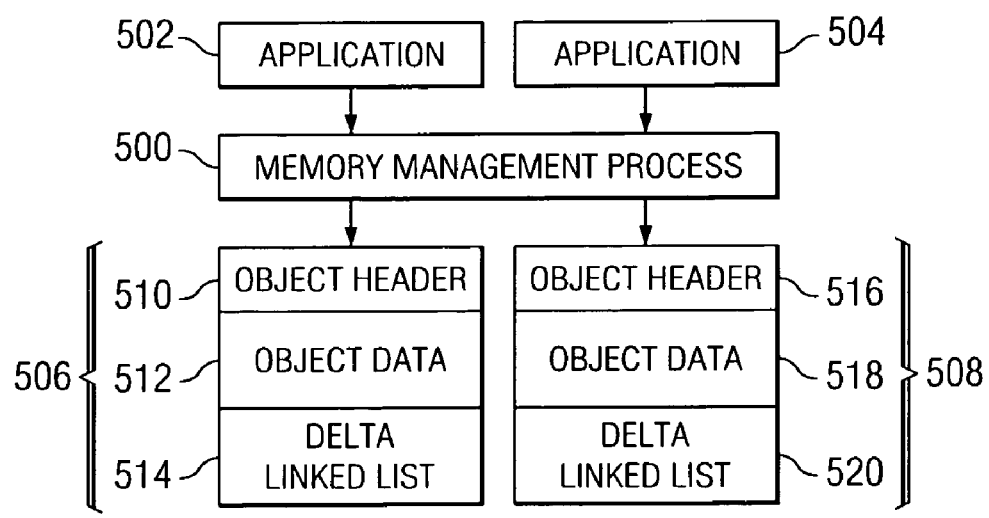
FIG. 5 is a diagram illustrating components used in providing data versioning and recovery management in accordance with a preferred embodiment of the present invention.

Turning next to FIG. 5, a diagram illustrating components used in providing data versioning and recovery management is depicted in accordance with a preferred embodiment of the present invention. In this illustrative example, memory management process 500 receives requests from application 502 and application 504 to create objects for use by the applications. In this example, memory segment 506 is created for use by application 502 and memory segment 508 is created for use by application 504.

Memory management process 500 may be implemented within memory management 310 in FIG. 3. Memory segments 506 and 508 may be located in a heap, such as heap 324 in FIG. 3. These memory segments may be allocated for objects used by the applications. Memory segments are similar to "chunks" of memory. Memory segment 506 includes memory segment header 510, memory segment data 512, and delta linked list 514. Memory segment header 510 includes an offset to point to the beginning of delta linked list 514 in this illustrative example. Memory segment data 512 contains the current data for memory segment 506. Delta linked list 514 contains entries that identify all of the delta data for memory segment 506.

In a similar fashion, memory segment header 516 provides an offset to the beginning of delta linked list 520. Memory segment data 518 contains the current data for memory segment 508. Delta linked list 520 contains all the delta data for changes made to memory segment data 518. In this illustrative example, memory management process 500 automatically increases the size of memory segment 506 in response to a request to allocate memory segment 506. This increased size includes space needed to store delta data. This type of allocation for memory segments 506 and 508 is performed automatically without requiring an application or a user to request the additional memory to store delta data. Additionally, memory management process 500 may allocate more space for memory segment 506 and memory segment 508 as the memory segment data and the delta data increase for these objects.

Figure 6:
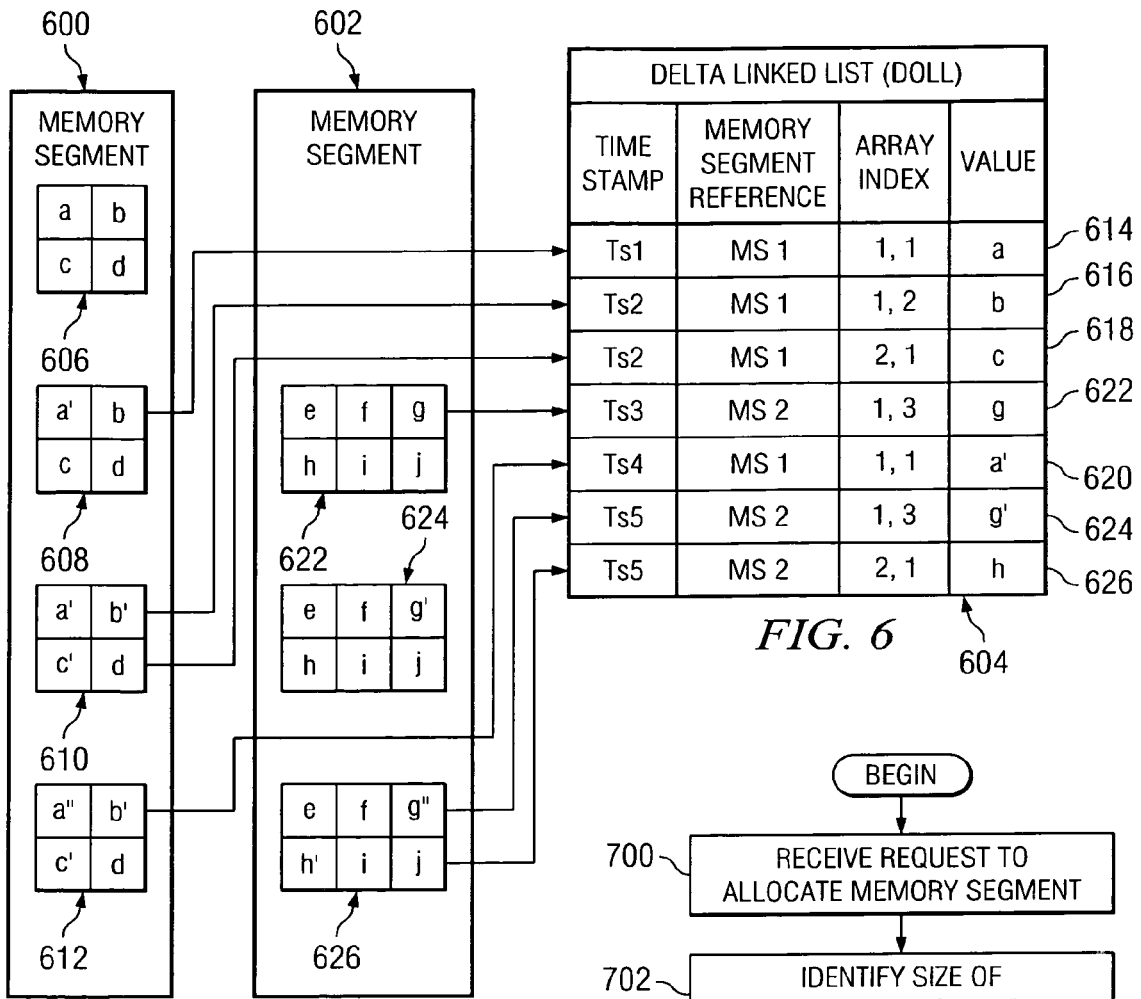
FIG. 6 is a diagram illustrating memory segments and a delta linked list in accordance with a preferred embodiment of the present invention.

Turning now to FIG. 6, a diagram illustrating objects and a delta linked list is depicted in accordance with a preferred embodiment of the present invention. In this example, memory segment 600 and memory segment 602 are examples of data elements requested by an application, such as applications 402 and 404 in FIG. 4. Space for memory segment 600 and memory segment 602 is allocated in a heap by a memory management subsystem. References to these data elements are returned to the applications for use. Additionally, the memory management subsystem also initializes delta linked list 604.

In these illustrative examples, memory segment 600 and memory segment 602 are examples of spreadsheets. Of course, these memory segments may contain data from numerous applications or objects. Further, all of the data for an application or object may not be located in a single memory segment.

Array 606 is the initial state of memory segment 600. Array 608 indicates that a change has been made to the value in cell (1,1). Array 610 indicates that changes have been made to the memory segment in cells (1,2) and (2,1). Array 612 indicates that changes have been made to memory segment 600 in cell (1,1). The initial change made in array 608 is stored as entry 614. Each of these entries includes a timestamp, which is used as the index. The entries also include a memory segment (MS) reference to identify the object with which the entry is associated. The array index identifies the cell in which the change has been made. The value in the entry identifies the change value. In other words, when the value a is changed to value a', the value a is stored in entry 614 to identify the delta between array 606 and array 608. The changes to array 610 are stored in entry 616 and 618. These two entries have the same timestamp because the changes were made at the same time by the application. Entry 620 identifies the change made to array 612 for memory segment 600.

In a similar fashion, the data in memory segment 602 is an example of a spreadsheet and shows the different states of the memory segment. Array 622 shows the initial state of memory segment 602. Array 624 shows that a change has been made in cell (1,3). Array 626 shows that a change has been made in cells (1,3) and (2,1) for memory segment 602. The change made to array 624 is recorded in delta linked list 604 as entry 622. The changes made to array 626 are shown in entries 624 and 626 in delta linked list 604.

As can be seen, these examples illustrate that the index or state for the deltas is associated with timestamps. An entry is made each time a change is made to one of the memory segments in these examples.

The current state of memory segment 600 is shown in array 612. The current state of memory segment 602 is shown in array 626. As a result, if a user, an application, or some other process wishes to return memory segment 600 to a prior state, delta linked list 604 may be used to perform this restoration.

In this illustrative example, the prior state is identified through a timestamp. If the memory management subsystem receives a request identifying a particular timestamp and memory segment, the memory segment may be returned to that state. In this example, if the timestamp is Ts2 for memory segment 600, the memory management subsystem may identify the most recent delta for memory segment 600 and return it to the prior state. For example, a" in cell (1,1) may be returned to a' using entry 620. The mechanism of the present invention traverses the linked list from the most current entry to the entry identified by the timestamp. Entries for memory segments other than the selected memory segment are ignored.

Next, the process identifies entries 616 and 618 as those corresponding to timestamp Ts2. The values for b' in cell (2,1) are returned to b and for c' in cell (2,1) are returned to c.

This type of traversal and restoration of data is provided as one manner in which the memory segment may be restored to a prior state. Of course, any process used to return a memory segment to a prior state using delta data may be employed in these illustrative examples.

The delta in data may be identified or calculated in a number of different ways. In these examples, the delta may be calculated using an exclusive OR (XOR). In other words, the value of prior data may be XOR'd with the value of the current data to identify the change in the current data as compared to the prior data. The result of this function is considered the delta in the data in this example. With this delta the current data may be restored to the value of the current data. The data may be, for example, the values for data in all of the heaps managed by a memory management system. The delta in the data also may be calculated using Moving Picture Experts Group (MPEG) processes, such as MPEG 2. With these processes every delta is similar to a video frame with respect to normal use in processing video data. Instead, the deltas are for one or more memory segments. As with a video, in which not every pixel necessarily changes from frame to frame, not all of the data elements within a memory segment may change from one delta to another delta. Compression algorithms, similar to MPEG2, can be employed which minimize the amount of memory required to store the necessary information, or delta, to restore the memory segments to prior values.

Figure 7:
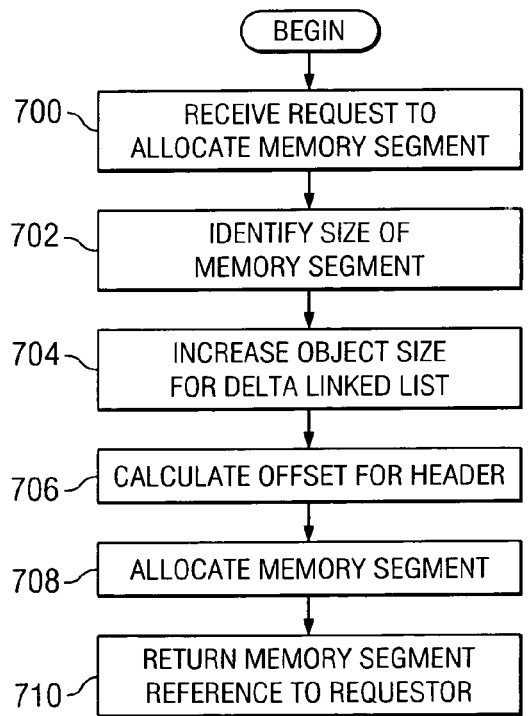
FIG. 7 is a flowchart of a process for allocating memory segments in accordance with a preferred embodiment of the present invention.

Turning now to FIG. 7, a flowchart of a process for allocating memory segments is depicted in accordance with a preferred embodiment of the present invention. The process illustrated in FIG. 7 may be implemented in a memory management process, such as memory management process 400 in FIG. 4.

The process begins by receiving a request to allocate a memory segment (step 700). In these examples, the request is received from an application, such as application 402 in FIG. 4. In response, the size of the memory segment is identified (step 702). Several options exist as to where, in memory, to place the delta linked list. The consideration of which option to choose is based upon tradeoffs in performance and/or memory usage. In a preferred, performance optimized embodiment, the delta linked list is co-resident in memory with the data element for which it contains delta information. In this case, at memory segment allocation, memory is allocated sufficient to contain both the data element and an estimated size for the delta linked list (step 704). The estimated size may be calculated in this example primarily by the number of deltas desired to be retained.

Next, an offset is calculated and stored in the object header (step 706). This offset is used by the memory management subsystem to point to the delta linked list. The memory segment is then allocated (step 708). A memory segment reference is then returned to the requester (step 710).

At this point, the requestor may access the allocated memory segment. In these illustrative examples, step 704 may be an optional step depending on the particular implementation. In the instance in which the delta linked list is allocated as a separate memory segment from the memory segment, this step may be skipped.

Figure 8:
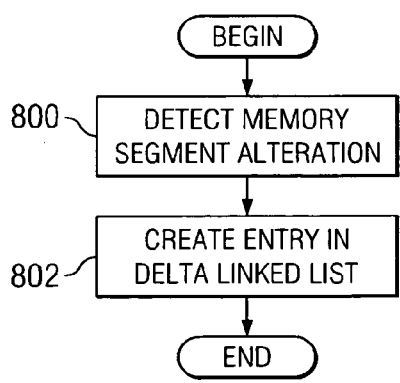
FIG. 8 is a flowchart of a process for storing delta data in accordance with a preferred embodiment of the present invention.

Turning now to FIG. 8, a flowchart of a process for storing delta data is depicted in accordance with a preferred embodiment of the present invention. The process illustrated in FIG. 8 may be implemented in a memory management process, such as memory management process 400 in FIG. 4.

The process begins by detecting an alteration of the data in the memory segment (step 800). This step may occur in different ways; for example, when the memory management process receives a request to change data in a memory segment. When that change is processed, an entry is created in the delta linked list (step 802) with the process terminating thereafter. This linked list could be a combined linked list for all memory segments being managed. Alternatively, the linked list could be one that was created within the memory segment when the memory segment was allocated or as a separate linked list associated with the memory segment.

Figure 9:
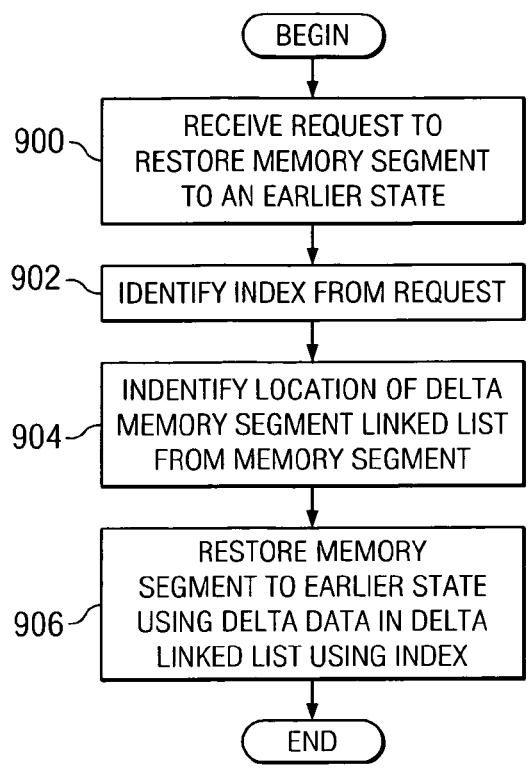
FIG. 9 is a flowchart of a process for returning a memory segment to an earlier state in accordance with a preferred embodiment of the present invention.

Turning now to FIG. 9, a flowchart of a process for returning a memory segment to an earlier state is depicted in accordance with a preferred embodiment of the present invention. In this illustrative example, the process in FIG. 9 may be implemented in a memory management process, such as memory management process 400 in FIG. 4.

The process begins by receiving a request to restore a memory segment to an earlier state (step 900). This request may be received from an application or a user input. Additionally, the request may be received from another process, such as an operating system or Java virtual machine process requiring the memory segment to be returned to some other state. An index and a memory segment identifier are identified from the request (step 902). The location of the delta linked list is identified from the memory segment (step 904). In step 904, the location of the delta linked list is identified using the offset from the memory segment header. Thereafter, the memory segment is restored to the earlier state using the delta data in the delta linked list using the index (step 906) with the process terminating thereafter.

Figure 10:
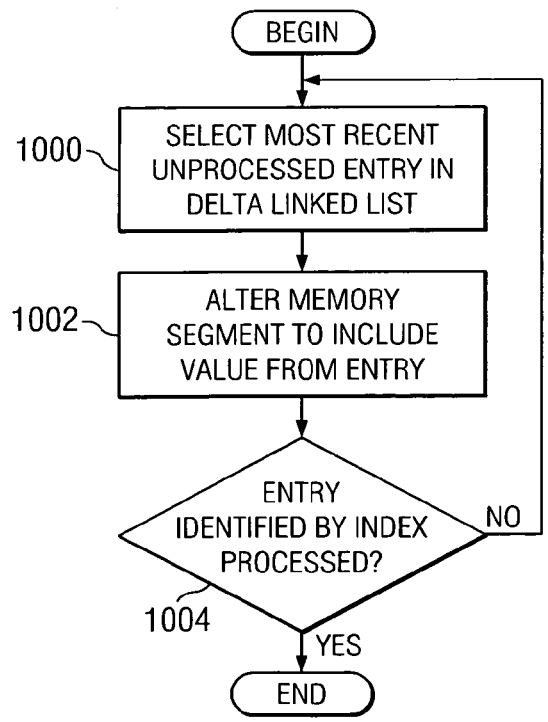
FIG. 10 is a flowchart of a process for restoring a memory segment to an earlier state in accordance with a preferred embodiment of the present invention.

Turning now to FIG. 10, a flowchart of a process for restoring a memory segment to an earlier state is depicted in accordance with a preferred embodiment of the present invention. The process illustrated in FIG. 10 is a more detailed description of step 906 in FIG. 9.

The process begins by selecting a most recent unprocessed entry in the delta linked list (step 1000). The memory segment is then altered to include the value from the entry (step 1002). Next, a determination is made as to whether an entry identified by the index has been processed (step 1004). This step determines whether the particular index, such as a timestamp for the memory segment, has been processed. If this entry has been processed, the memory segment has been returned to the desired state with the process terminating thereafter. Otherwise, the process returns to step 1000 to select the next most recent unprocessed entry in the delta linked list. In the instance in which the linked list includes entries for other memory segments, a determination may be included to determine whether the memory segment identifier is for the memory segment that is being restored.

Figure 11:
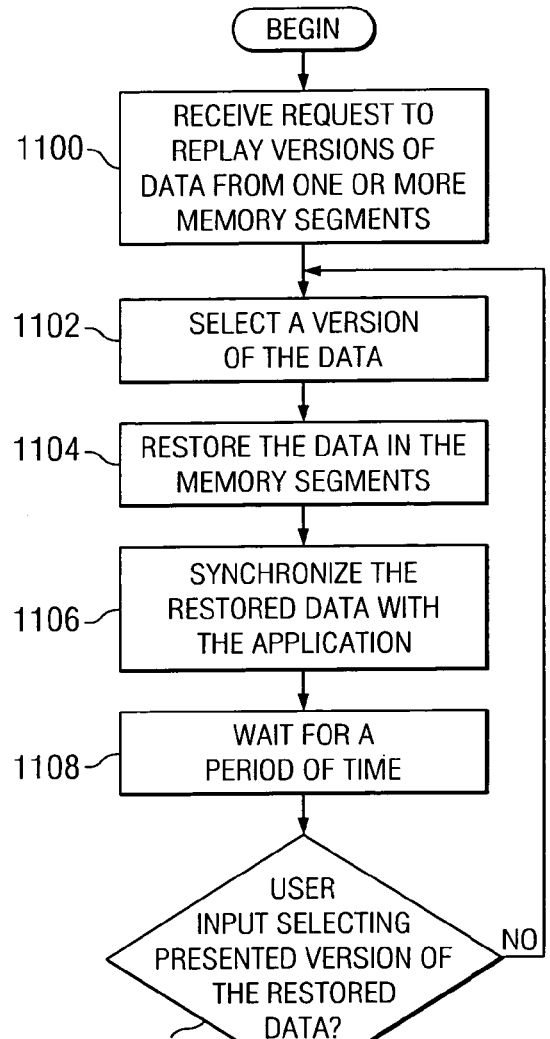
FIG. 11 is a flowchart of a process for presenting different versions of data in accordance with a preferred embodiment of the present invention.

With reference now to FIG. 11, a flowchart of a process for presenting different versions of data is depicted in accordance with a preferred embodiment of the present invention. The process illustrated in FIG. 11 may be implemented in a memory management process, such as memory management process 500 in FIG. 5. This process may be used to restore data in memory segments and cause a selected application to present the restored data in a fashion similar to synchronizing a video for presentation. In this case, the data is synchronized with the application to allow the user to view the different versions of the data in one or more memory segments.

The process begins by receiving a request to play versions of data for one or more memory segment (step 1100). Next, a version of the data is selected (step 1102). The data for the memory segments is restored (step 1104) and the restored data is then synchronized with the application (step 1106).

Next, the process waits for a period of time (step 1108). After the period of time has passed, a determination is made as to whether a user input has been received selecting the presented version of the restored data (step 1110). If a user input is received selecting a presented version of the restored data, the process terminates. Otherwise, the process returns to step 1102 to select the next version of data for restoration and presentation.

In this manner, different versions of data may be "replayed" to a user in a fashion similar to a video or a movie. This process allows the user to pause or select the data desired. Thus, the present invention provides an improved method, apparatus, and computer instructions for saving delta data and restoring a memory segment to a prior state using the delta data. In these examples, a data structure containing entries is used to store changes in the data and memory segments. This data structure takes the form of a linked list in these illustrative examples. Of course, other types of data structures may be used, such as, for example, a table. In the depicted examples, the linked list may be a single linked list for all memory segments being managed by a memory management subsystem. Alternatively, this data structure may be located as part of the memory segment or in a separate data structure in which each data structure is associated with a particular memory segment that is being managed by the memory management subsystem.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing versioning data for memory segments, the method comprising:

allocating a memory segment for data in response to a request from a requestor to allocate the memory segment;

creating within the memory segment a versioning data structure for the memory segment, wherein the versioning data structure is used to store delta data for changes in the data for the memory segment, and wherein the memory segment is associated with the versioning data structure;

detecting a change in the data for the memory segment;

responsive to detecting the change in the data for the memory segment, storing the delta data in the versioning data structure within the memory segment, wherein the delta data is the change in the data between a prior version and a current version of the data in a changed form; and returning a reference to the memory segment containing the versioning data structure to the requestor that requested allocation of the memory segment.

2. The method of claim 1 further comprising;

returning the memory segment to the prior state using the versioning data structure.

3. The method of claim 1, wherein the memory segment is associated with the versioning data structure using at least one of a pointer and an offset.

4. The method of claim 1, wherein the allocating step, the creating step, the detecting step, and the storing step are located in a memory management subsystem.

5. The method of claim 1, wherein the memory management subsystem is located in a virtual machine.

6. The method of claim 5, wherein the virtual machine is a Java virtual machine.

7. The method of claim 1, wherein the allocating step comprises:

allocating the memory segment to include space for the versioning data structure.

8. The method of claim 1, wherein the versioning data structure is a linked list.

9. The method of claim 1, wherein a versioning data structure is created for each allocated memory segment.

10. The method of claim 3, wherein the pointer is an offset to the versioning data structure.

11. The method of claim 3, wherein the pointer is located in a memory segment header in the memory segment.

12. The method of claim 1, wherein the memory segment is allocated prior to creation of the versioning data structure.

13. A computer program product having a computer recordable type medium for managing versioning data for memory segments, the computer program product comprising:

first instructions for allocating a memory segment for data in response to a request from a requestor to allocate the memory segment;

second instructions for creating within the memory segment a versioning data structure for the memory segment, wherein the versioning data structure is used to store delta data for changes in the data for the memory segment and wherein the memory segment is associated with the versioning data structure;

third instructions for detecting a change in the data for the memory segment;

fourth instructions, responsive to detecting the change in the data for the memory segment, storing the delta data in the versioning data structure within the memory segment, wherein the delta data is the change in the data between a prior version and a current version of the data in a changed form; and fifth instructions for returning a reference to the memory segment containing the versioning data structure to the requestor that requested allocation of the memory segment.

14. The computer program product of claim 13 further comprising;

sixth instructions for returning the memory segment to the prior state using the versioning data structure.

15. The computer program product of claim 13, wherein the memory segment is associated with the versioning data structure using at least one of a pointer and an offset.

16. The computer program product of claim 13, wherein the first instructions, the second instructions, the third instructions, the fourth instructions, and the fifth instructions are executed in a memory management subsystem.

17. The computer program product of claim 13, wherein the memory management subsystem is located in a virtual machine.

18. The computer program product of claim 17, wherein the virtual machine is a Java virtual machine.

19. The computer program product of claim 13, wherein the first instructions comprises:

sub instructions for allocating the memory segment to include space for the versioning data structure.

20. The computer program product of claim 13, wherein the versioning data structure is a linked list.

21. The computer program product of claim 13, wherein a versioning data structure is created for each allocated memory segment.

22. The computer program product of claim 15, wherein the pointer is an offset to the versioning data structure.

23. A data processing system for managing versioning data for memory segments, the data processing system comprising:

allocating means for allocating a memory segment for data in response to a request from a requestor to allocate the memory segment;

creating means for creating within the memory segment a versioning data structure for the memory segment, wherein the versioning data structure is used to store delta data for changes in the data for the memory segment and wherein the memory segment is associated with the versioning data structure;

detecting means for detecting a change in the data for the memory segment;

storing means, responsive to detecting the change in the data for the memory segment, for storing the delta data in the versioning data structure within the memory segment, wherein the delta data is the change in the data between a prior version and a current version of the data in a changed form; and returning means for returning a reference to the memory segment containing the versioning data structure to the requestor that requested allocation of the memory segment.

24. The data processing system of claim 23 further comprising;

returning means for returning the memory segment to the prior state using the versioning data structure.

25. The data processing system of claim 23, wherein the memory segment is associated with the versioning data structure using at least one of a pointer and an offset.

26. The data processing system of claim 23, wherein the allocating means, the creating means, the detecting means, and the storing means are located in a memory management subsystem.

27. The data processing system of claim 23, wherein the memory management subsystem is located in a virtual machine.

28. The data processing system of claim 27, wherein the virtual machine is a Java virtual machine.

29. A data processing system for managing versioning data for memory segments, the data processing system comprising:
- a bus system;
- a communications unit connected to the bus system;
- a memory connected to the bus system, wherein the memory includes a set of instructions; and
- a processing unit connected to the bus system, wherein the processing unit executes the set of instructions, responsive to a request from a requestor to allocate a memory segment, to allocate the memory segment for data; create within the memory segment a versioning data structure for the memory segment, in which the versioning data structure is used to store changes in the data for the memory segment and in which the memory segment includes a pointer to the versioning data structure; detect a change in the data for the memory segment, in which the change in the data forms delta data; responsive to detecting the change in the data for the memory segment, store the delta data in the versioning data structure within the memory segment, in which the delta data is the change in the data between a prior version and a current version of the data in a changed form; and return a reference to the memory segment containing the versioning data structure to the requestor that requested allocation of the memory segment.

* * * * *